(12) United States Patent
Foster

(10) Patent No.: US 12,524,787 B2
(45) Date of Patent: *Jan. 13, 2026

(54) SYSTEMS AND METHODS FOR DETERMINING AN EVENT VALIDATION STATUS

(71) Applicant: William Foster, Boston, MA (US)

(72) Inventor: William Foster, Boston, MA (US)

( * ) Notice: Subject to any disclaimer, the term of this patent is extended or adjusted under 35 U.S.C. 154(b) by 101 days.

This patent is subject to a terminal disclaimer.

(21) Appl. No.: 18/636,192

(22) Filed: Apr. 15, 2024

(65) Prior Publication Data

US 2024/0265428 A1 Aug. 8, 2024

Related U.S. Application Data

(63) Continuation of application No. 17/570,150, filed on Jan. 6, 2022, now Pat. No. 11,961,128, which is a continuation of application No. 15/466,682, filed on Mar. 22, 2017, now Pat. No. 11,227,317.

(60) Provisional application No. 62/312,722, filed on Mar. 24, 2016.

(51) Int. Cl.
*G06Q 30/04* (2012.01)
*G06Q 40/08* (2012.01)
*G06T 11/20* (2006.01)

(52) U.S. Cl.
CPC ............. *G06Q 30/04* (2013.01); *G06Q 40/08* (2013.01); *G06T 11/20* (2013.01)

(58) Field of Classification Search
CPC ......... G06Q 30/04; G06Q 40/08; G06T 11/20
USPC .......................................................... 705/34
See application file for complete search history.

(56) References Cited

U.S. PATENT DOCUMENTS

2006/0161463 A1* 7/2006 Poonnen ............... G06Q 40/08
 707/999.01
2011/0314439 A1* 12/2011 Colgrave ................. G06F 8/71
 717/101
2015/0278474 A1* 10/2015 Stueckemann ........ G06Q 10/10
 705/2

\* cited by examiner

*Primary Examiner* — Luna Champagne
(74) *Attorney, Agent, or Firm* — Foley & Lardner LLP

(57) ABSTRACT

Systems and methods for determining an event validation status are provided. A start time and at least one authorization time for each of a plurality of event components relating to an event can be received. An authorization status of each event component can be determined across a predetermined period of time, based on the start time and the at least one authorization time of each of the plurality of event components. A validation status of the event can be determined across the predetermined period of time, based on the authorization status of each event component across the predetermined period of time. Graphical information corresponding to a visual representation of the authorization status of each event component and the validation status of the event across the predetermined period of time can be generated and displayed on an electronic display device.

20 Claims, 3 Drawing Sheets

SYSTEMS AND METHODS FOR DETERMINING AN EVENT VALIDATION STATUS

RELATED APPLICATIONS

This application is a continuation of U.S. patent application Ser. No. 17/570,150, filed Jan. 6, 2022 and entitled "Systems And Methods For Determining An Event Validation Status," which is a continuation of U.S. patent application Ser. No. 15/466,682, filed Mar. 22, 2017 and entitled "Systems And Methods For Determining An Event Validation Status," (now issued as U.S. Pat. No. 11,227,317) which claims priority to U.S. Provisional Patent Application No. 62/312,722, filed Mar. 24, 2016 and entitled "Software Enhancement To Increase Efficiency Through Graphical Interpretation Of Data," all of which are hereby incorporated by reference in their entireties.

TECHNICAL FIELD

Arrangements of the present disclosure generally relate to improvements in the graphical representation of data representing various events.

BACKGROUND

Organizations such as businesses and government entities track various events that may be dependent on a variety of conditions or event components. For example, business policies, administrative rules, or laws may require that certain conditions are met before the occurrence of an action, such as billing a customer. Due to the complexity of such policies, rules, or laws, it can be difficult to accurately track all of the relevant conditions associated with an event. As a result, the validation status of an event at a given point in time may be unclear to employees of the organization or others who require such information, because the conditions impacting the validation status of the event are not accurately tracked over time.

SUMMARY

One example aspect of this disclosure relates to a system for determining an event validation status. The system can include an event parameter determination circuit configured to receive a start time and at least one authorization time for each of a plurality of event components relating to an event. The system can include a component authorization circuit configured to determine an authorization status of each event component across a predetermined period of time, based on the start time and the at least one authorization time of each of the plurality of event components. The system can include an event validation circuit configured to determine a validation status of the event across the predetermined period of time, based on the authorization status of each event component across the predetermined period of time. The system also can include a graphical user interface (GUI) circuit configured to generate graphical information corresponding to a visual representation of the authorization status of each event component and the validation status of the event across the predetermined period of time, and to cause the graphical information to be displayed on an electronic display device.

Another example aspect of this disclosure relates to a computer-implemented method for determining an event validation status. The method can include receiving, by an event parameter determination circuit, a start time and at least one authorization time for each of a plurality of event components relating to an event. The method can include determining, by a component authorization circuit, an authorization status of each event component across a predetermined period of time, based on the start time and the at least one authorization time of each of the plurality of event components. The method can include determining, by an event validation circuit, a validation status of the event across the predetermined period of time, based on the authorization status of each event component across the predetermined period of time. The method can include generating, by a graphical user interface (GUI) circuit, graphical information corresponding to a visual representation of the authorization status of each event component and the validation status of the event across the predetermined period of time. The method also can include causing, by the GUI circuit, the graphical information to be displayed on an electronic display device.

Another example aspect of this disclosure relates to a non-transitory computer-readable storage medium having instructions encoded thereon which, when executed by one or more processors, cause the one or more processors to perform a method for determining an event validation status. The method can include receiving a start time and at least one authorization time for each of a plurality of event components relating to an event. The method can include determining an authorization status of each event component across a predetermined period of time, based on the start time and the at least one authorization time of each of the plurality of event components. The method can include determining a validation status of the event across the predetermined period of time, based on the authorization status of each event component across the predetermined period of time. The method can include generating graphical information corresponding to a visual representation of the authorization status of each event component and the validation status of the event across the predetermined period of time. The method also can include causing the graphical information to be displayed on an electronic display device.

These and other aspects and arrangements are discussed in detail below. The foregoing information and the following detailed description include illustrative examples of various aspects and arrangements, and provide an overview or framework for understanding the nature and character of the claimed aspects and arrangements. The drawings provide illustration and a further understanding of the various aspects and arrangements, and are incorporated in and constitute a part of this specification.

DETAILED DESCRIPTION

Figure 1:
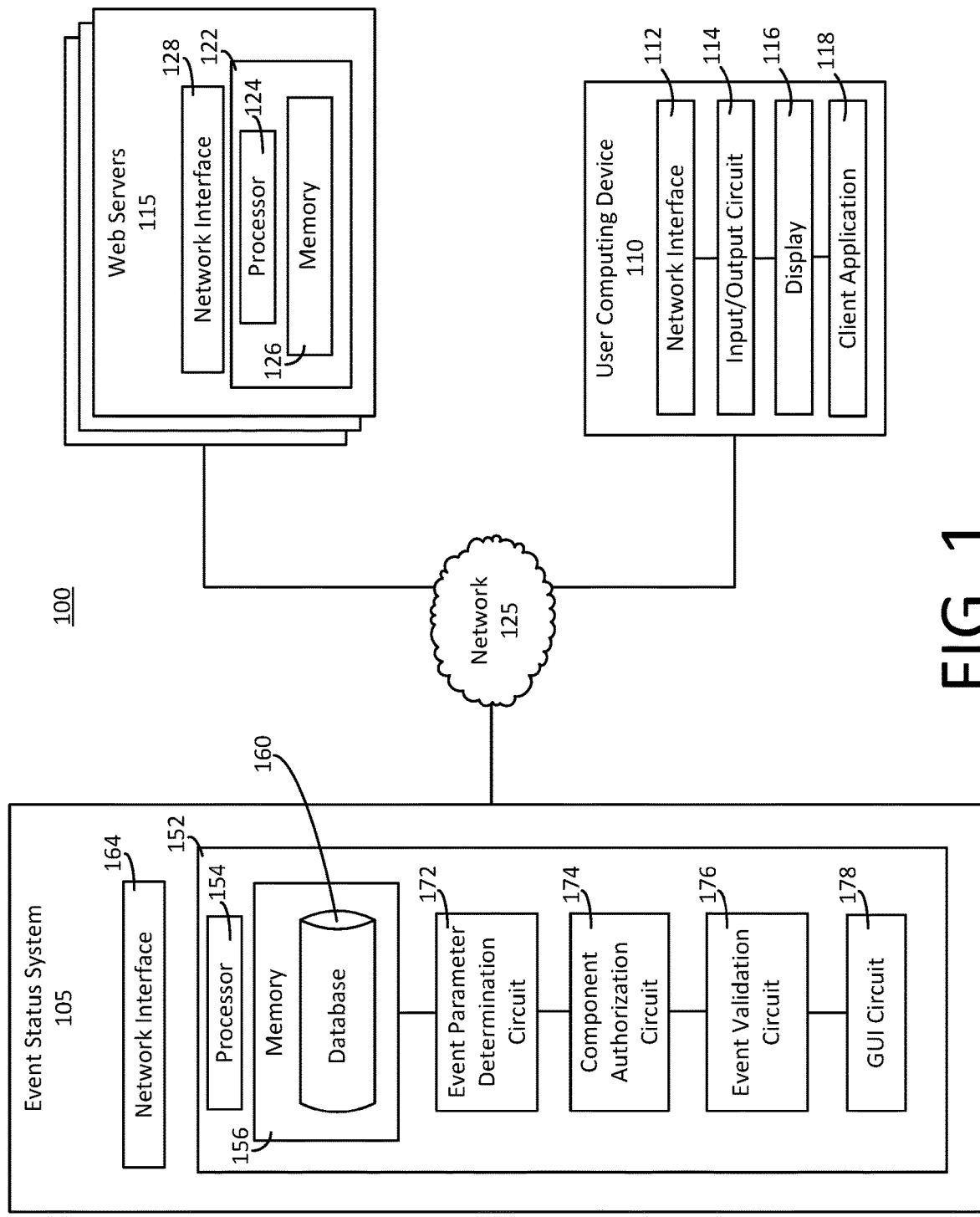
FIG. 1 is a block diagram of a system for determining an event validation status, according to an example arrangement.

The present disclosure is generally directed to systems and methods for determining an event validation status. An event validation status may be dependent on a variety of factors, which can be referred to as event components. For example, business policies, administrative rules, or laws may require the fulfillment of particular conditions before the occurrence of an action, such as billing a customer. This disclosure primarily discusses technologies for validating a billing status of a customer based on the fulfillment of various criteria, such as the insurance status of the customer, the diagnosis and assessment of the customer's medical condition, and the development of a treatment plan tailored for the customer. In addition, the presence of required signatures on documentation related to such event components also may impact the customer's billing status. Because such a wide variety of factors are relevant to the overall billing status, it can be difficult for staff at a medical facility to track all of these factors and to accurately determine the customer's billing status at a given point in time. The graphical presentation of data representing the customer's billing status and the various factors on which the billing status depends, as described in this disclosure, can simplify this process, thereby facilitating more accurate and appropriate billing of the customer by the medical facility. However, it should be noted that the techniques described herein are not confined to the field of medical billing, and can also be applied to a variety of other fields in which the validation status of a particular event depends on a variety of event components or conditions that must be fulfilled.

In some arrangements, information representing each event component and the event validation status can be arranged in a time-dependent bar graph. Such a presentation can facilitate a quick determination of the event validation status at each point over a predetermined period of time, thereby allowing a user, such as a staff member of a medical facility, to easily determine points in time when at least some of the conditions represented by the event components are unfulfilled. Quickly identifying these instances can in turn allow the necessary steps for fulfilling the conditions to be taken in a more timely manner. For example, each event component can be represented by a bar that extends along a common time axis. The dimensions of each bar can correspond to various timing parameters associated with the respective event component, such as a start time and an end time. In addition, the visual appearance of each bar may be altered for portions of the bar according to an authorization status of each event component over time. In some arrangements, an event component such as diagnosis and assessment of a customer may have a start time that differs from its authorization time. For example, after diagnosis and assessment has been completed for a customer, authorization may not occur until a physician signs a document related to the diagnosis and assessment of the customer, and there may be significant delay between the time at which the diagnoses and assessment is completed and the time at which the signature is obtained. Thus, in this example, the bar representing the diagnosis and assessment event component may change appearance for times after the time at which the signature is obtained to indicate its authorization status.

The event validation status, which depends on the various event components, also can be represented as a bar within the bar graph. For example, for all times during which each event component is present and authorized within the bar graph, the event validation status bar also can be displayed, indicating the event is valid for these times. Times during which the event is not valid will thus be easily identifiable by the absence of the event validation status bar, and staff members can use the bar graph to quickly and easily identify steps that must be taken to validate the event at each point in time according to the bar graph. In some arrangements, the bar graph can be displayed on an electronic display device and can include interactive elements, thereby serving as a graphical user interface (GUI) with which a staff member can interact. For example, in some arrangements, selecting the bar graph for a particular event component can cause the documentation associated with that component to be displayed on the electronic display device.

Thus, the systems and methods of the present disclosure include innovative, non-conventional techniques for determining and visually representing an event validation status, which address the shortcomings of the traditional event validation status techniques described above. In some aspects, the solutions discussed herein provide improved validation of an event status by efficiently using computing resources and available electronic health records to identify missing documentation that may be required to validate an event, which may otherwise not be readily apparent. These and other aspects of the present solution are described more fully below.

FIG. 1 is a block diagram of a system 100 for validating an event status, according to an example arrangement. The system 100 includes an event status system 105, a user computing device 110, and a plurality of web servers 115. The user computing device 110 and the web servers 115 are communicatively coupled to one another, and to the event status system 105, via a network 125. In some arrangements, the network 125 can include any type or form of communication network, such as the Internet, a private network, a wide area network (WAN), or a combination thereof. It should be understood that, although only a single network 125 is shown in FIG. 1 for illustrative purposes, in some arrangements the components of the system 100 are interconnected to one another via two or more interconnected computer networks that may be combined to implement the network 125.

The event status system 105 is configured to determine an event validation status of an event, based on a plurality of event components that impact the validation status of the event. In some arrangements, the event may be an event associated with a patient or other customer of a medical facility. For example, the event validation status may determine whether the medical facility has authority to bill the customer for medical services rendered at various points in time. In some arrangements, the medical facility can receive, determine, or otherwise access information relating to a plurality of event components that impact the overall validation status of the event. The event status system 105 can process the information relating to the various event components to determine an authorization status of each event component over a predetermined period of time, and can use the authorization status information to determine the overall event validation status of the predetermined period of time. In some arrangements, the event status system 105 also can be configured to provide a graphical representation of the event components and the event validation status over the predetermined period of time. The graphical representation can be incorporated into a GUI to be used by employees of the medical facility to quickly and easily determine the event validation status and to see additional information, such as documentation, related to each of the event components.

Thus, in some arrangements, the event status system 105 can be owned or operated by the medical facility, which may be, for example, a healthcare provider, a hospital, a medical insurer, or a medical device manufacturer. The medical facility may store information relating to the health of its various customers. Such information can be received from the web servers 115, which may be owned or operated by other medical facilities. For example, in some arrangements, the medical facility that maintains the event status system 105 can be a healthcare provider, and one or more of the web servers 115 can be maintained by a medical insurer whose customers include at least some of the customers of the healthcare provider. Thus, the healthcare provider can receive insurance information from the web servers 115. In some other arrangements, information can be received by the event status system 105 directly from patients, for example during a medical examination or other procedure performed by an employee of the healthcare provider that maintains the event status system 105. For each patient, the event status system 105 can determine a plurality of event components impacting an event validation status, such as whether the patient is valid for billing by the healthcare provider. This functionality is described more fully below.

The user computing device 110 can be a computing device associated with various users, each of whom may be a staff member, employee, or other person working for the healthcare provider who maintains the event status system 105. The user computing device 110 may be any type or form of computing device owned by, operated by, accessed by, or otherwise associated such users. In some arrangements, the user computing device 110 can be at least one of a server, a desktop computer, or a laptop computer. In some other arrangements, the user computing device 110 can be a mobile computing device such as a tablet computing device, or a handheld computing device, such as a smartphone.

The user computing device 110 includes a network interface 112, an input/output circuit 114, a display 116, and a client application 118. The network interface 112 of the user computing device 110 is adapted for and configured to establish a communication session via the network 125 with the event status system 105 and/or the web servers 115. Accordingly, the network interface 112 can include any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), a wired network transceiver (e.g., an Ethernet transceiver), or a combination thereof (e.g., both a cellular transceiver and a Bluetooth transceiver).

The display 116 is used to present information relating to the event validation status and/or the event components of a customer. In this regard, the display 116 is communicably and operatively coupled to the input/output circuit 114 to provide a user interface for receiving and displaying information on the user computing device 110. The input/output circuit 114 is structured to receive and provide communication(s) to a user of the user computing device 110 (i.e., a staff member of a medical facility). Thus, the input/output circuit 114 can be structured to exchange data, communications, instructions, etc., with an input/output component of the user computing device 110. Accordingly, in one arrangement, the input/output circuit 114 includes an input/output device such as a display device, a touchscreen, a keyboard, and a microphone. In another arrangement, the input/output circuit 114 may include communication circuitry for facilitating the exchange of data, values, messages, and the like between an input/output device and the components of the user computing device 110. In yet another arrangement, the input/output circuit 114 may include machine-readable media for facilitating the exchange of information between the input/output device and the components of the user computing device 110. In still another arrangement, the input/output circuit 114 may include any combination of hardware components (e.g., a touchscreen), communication circuitry, and machine-readable media.

The client application 118 is communicably coupled to the event status system 105 via the network 125, and may be structured to permit a user, such as a medical facility staff member, to receive patient health data from the event status system 105 and to view information related to the event validation status and various event components for the patient. In this regard, the client application 118 may provide graphical displays indicative of the authorization status of each event component (e.g., diagnosis and assessment, treatment plan, insurance status, etc.) and the overall event validation status (e.g., whether the medical facility has the authority to bill the patient). Further, in some arrangements, the client application 118 may also permit the user to interact with graphical information presented, for example by displaying documentation associated with an event component in response to a user selection of the event component.

The web servers 115 correspond to a computing device owned by, operated by, accessed by, or otherwise associated with third parties. In some arrangements, a web server 115 hosts a patient health data repository. Such a web server stores information corresponding to electronic health records (EHRs) each corresponding to a respective patient. The web servers 115 also may host data relating to an insurance status of each patient Like the user computing devices 110, each web server 115 also can be implemented as any type and form of computing device, including a server, a desktop computer, a laptop computer, a tablet computing device, or a smartphone. In some arrangements, health or insurance information hosted by the web servers 115 can be registered with the event status system 105. For example, owners of the web servers 115, or patients associated with health and insurance records stored by the web servers 115, may explicitly provide permission to the event status system 105 to access the health and insurance information hosted by the web servers 115.

Each web server 115 includes a processing circuit 122 having a processor 124 and a memory 126. The processor 124 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 126 (e.g., RAM, NVRAM, ROM, Flash Memory, hard disk storage, etc.) may store data and/or computer code for facilitating the various processes described herein. Moreover, the one or more memory devices 126 may be or may include tangible, non-transient volatile memory or non-volatile memory. Accordingly, the one or more memory devices 126 may include database components, object code components, script components, or any other type of information structure for supporting the various activities and information structures described herein.

Each web server 115 further includes a network interface 128. The network interface 128 is adapted for and configured to establish a communication session via the network 125 with the event status system 105 and the user computing device 110. Accordingly, the network interface 128 includes any of a cellular transceiver (CDMA, GSM, LTE, etc.), a wireless network transceiver (e.g., 802.11X, ZigBee, Bluetooth, etc.), a wired network transceiver (e.g., an Ethernet transceiver), or a combination thereof (e.g., both a cellular transceiver and a Bluetooth transceiver).

The event status system 105 is configured to determine an event validation status for an event, based on a plurality of event components. As shown, the event status system 105 includes a processing circuit 152 having a processor 154 and a memory 156. The processor 154 may be implemented as a general-purpose processor, an ASIC, one or more FPGAs, a DSP, a group of processing components, or other suitable electronic processing components. The one or more memory devices 156 (e.g., RAM, NVRAM, ROM, Flash Memory, hard disk storage, etc.) may store data and/or computer code for facilitating the various processes described herein. Moreover, the one or more memory devices 156 may be or include tangible, non-transient volatile memory or non-volatile memory. Accordingly, the one or more memory devices 156 may include database components such as the database 160, object code components, script components, or any other type of information structure for supporting the various activities and information structures described herein.

The event status system 105 further includes a network interface 164, which is used to establish connections with other components of the system 100 by way of the network 125. The network interface 164 includes program logic that facilitates connection of the event status system 105 to the network 125. The network interface 164 supports communication between the event status system 105 and other systems, such as the user computing devices 110 and the web servers 115. For example, in some arrangements the network interface 164 includes at least one of a cellular modem, a Bluetooth transceiver, a radio-frequency identification (RFID) transceiver, and an NFC transmitter. In some arrangements, the network interface 164 includes the hardware and machine-readable media sufficient to support communication over multiple channels of data communication. Further, in some arrangements, the network interface 164 includes cryptography capabilities to establish a secure or relatively secure communication session with the user computing device 110 and the web servers 115. In this regard, patient health data (or other types of data) may be encrypted and transmitted to prevent or substantially prevent the threat of interception by a third party.

The event status system 105 further includes a database 160. The database 160 is configured to hold, store, categorize, and otherwise serve as a repository for information related to event components of an event validation status for each of a plurality of customers. For example, the database 160 may store data related to health and insurance for patients. The database 160 is structured to selectively provide access to the information stored therein. In this regard, the database 160 is communicably and operatively coupled to a an event parameter determination circuit 172, a component authorization circuit 174, an event validation circuit 176, and a graphical user interface (GUI) circuit 178. Together, the event parameter determination circuit 172, the component authorization circuit 174, the event validation circuit 176, and the GUI circuit 178 are configured to determine an overall event validation status for a customer and to generate and present a GUI representing such information. The functionality of these circuits is described more fully below in connection with FIG. 2.

As used herein, the term "circuit" may include elements having hardware structured to execute the functions described herein. In some arrangements, each respective circuit may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of circuit. In this regard, each circuit may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

Each circuit may also include one or more dedicated processors communicatively coupled to one or more dedicated memory or memory devices. The one or more dedicated processors may execute instructions stored in the dedicated memory or may execute instructions otherwise accessible to the one or more dedicated processors. The one or more dedicated processors may be embodied in various ways. The one or more dedicated processors may be constructed in a manner sufficient to perform at least the operations described herein. In some arrangements, the one or more dedicated processors may be shared by multiple circuits. Alternatively or additionally, the one or more dedicated processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Figure 2:
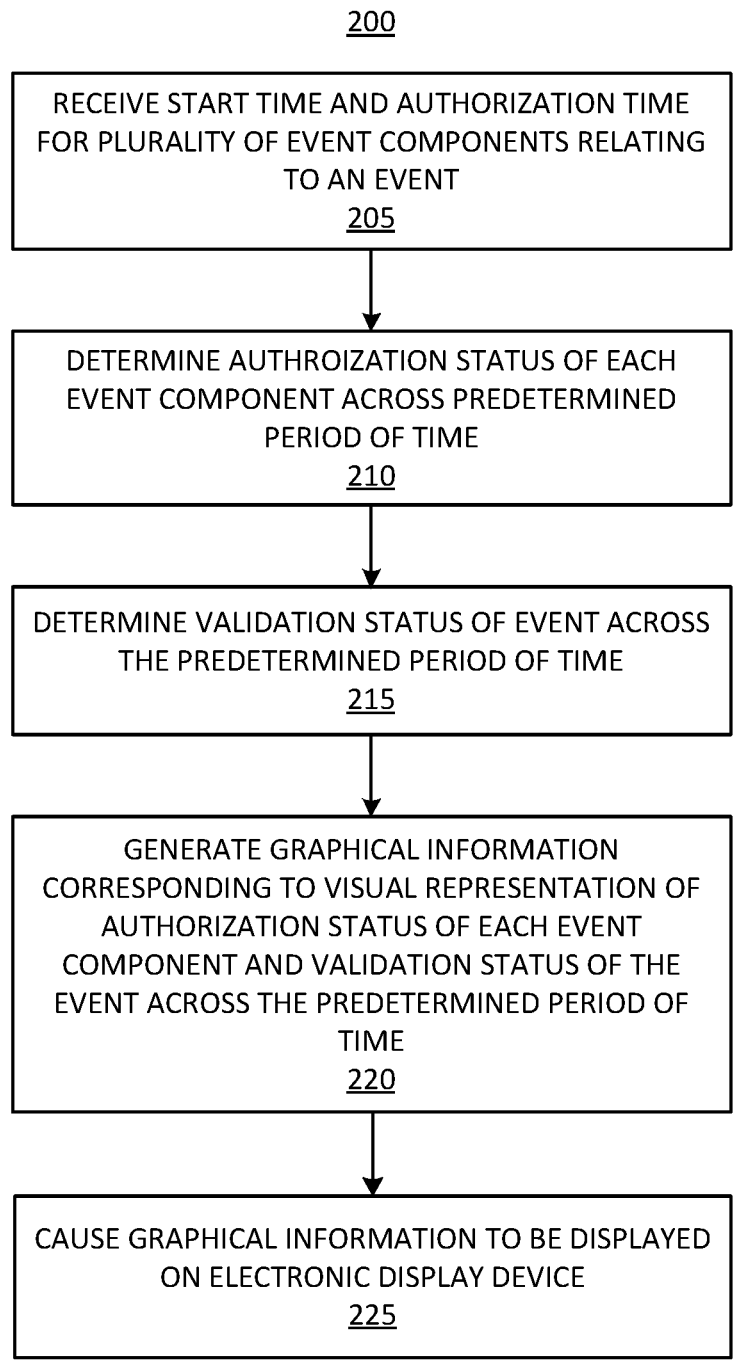
FIG. 2 is a flowchart illustrating an example method for determining an event validation status, according to an example arrangement

FIG. 2 is a flowchart illustrating an example method 200 for determining an event validation status, according to an example arrangement. In some arrangements, the method 200 can be performed by the event parameter determination circuit 172, the component authorization circuit 174, the event validation circuit 176, and the GUI circuit 178 shown in FIG. 1. Thus, the method 200 of FIG. 2 is described below with reference to these and other components of FIG. 1.

Referring again to FIGS. 1 and 2, the method 200 begins with receiving a start time and at least one authorization time for each of a plurality of event components relating to an event (205). In some arrangements, this can be performed by the event parameter determination circuit 172. The event can relate to a billing status of a customer. For example, the event correspond to whether or not an entity, such as a medical facility or other healthcare provider, has the authority to bill the customer or the customer's insurance company. Thus, in such an example, the event components can include any factors impacting the ability of the medical facility to bill the customer, such as the customer's insurance status over time, whether the customer has received a diagnosis and assessment, whether a treatment plan has been developed for the customer, and any other required authorization event component that may impact the billing status of the customer. Certain event components may require a signature in order to become valid. That is, an event component may include a start time (i.e., the time at which a diagnosis and assessment is completed for an event component corresponding to diagnosis and assessment), but may not become valid until after a physician or other party has signed a related document. Thus, in some arrangements the authorization time can be different from the start time. However, some event components may become valid as soon as their start time is set, and therefore the authorization time may be the same as the start time. In some arrangements, the event parameter determination circuit 172 receives the start time and/or the authorization time for an event component from a remote computing device, such as one of the web servers 115 shown in FIG. 1. For example, for an event component relating to an insurance status of a customer may be received from a server owned, operated, or otherwise maintained by a third party insurance company. In some arrangements, the event parameter determination circuit 172 receives the start time and/or the authorization time from an internal source. For example, the event parameter determination circuit 172 can receive such information from a user interacting directly with the event status system 105 or from the user computing device 110 via the network 125.

The method 200 includes determining an authorization status of each event component across a predetermined period of time, based on the start time and the at least one authorization time of each of the plurality of event components (210). This step can be performed by the component authorization circuit 174. In some arrangements, an event component may be valid for any length of time after it becomes authorized. That is, an event component may have no end date or expiration date. In such an arrangement, the component authorization circuit 174 can record the end date for the event component as infinity, or as a maximum representable integer, and can further determine that the event component is authorized for all times after its authorization time. The component authorization circuit 174 can receive the authorization time for an event component, for example, from the event parameter determination circuit 172. In some arrangements, an event component may only remain valid for a predetermined length of time. For example, an insurance policy may have a predetermined duration (e.g., 12 months). Thus, the component authorization circuit 174 can determine that such an event component is authorized only for times between the authorization time and the end date.

The method 200 includes determining a validation status of the event across the predetermined period of time, based on the authorization status of each event component across the predetermined period of time (215). This can be performed, for example, by the event validation circuit 176. In some arrangements, the validation status of the event depends on the authorization status of at least two of the event components. For example, some events may only be valid for time periods during which every event component is authorized. Thus, in this example, the validation circuit 176 can determine the validation status of the event over time by performing a logical "AND" operation on the authorization statuses of each event component. That is, for times during which all of the event components are authorized, the event is valid, and during times when at least one of the event components is not authorized, the event is invalid. In some other arrangements, the validation circuit 176 can be configured to determine the validation status of the event according to a different set of rules. For example, the validation circuit 176 can be configured to determine that an event is valid during time periods in which a majority of event components are authorized, or during time periods in which a predetermined number of event components are authorized. In some arrangements, the validation circuit 176 can make such a determination according to a set of policies, rules, or laws associated with the event.

The method 200 includes generating graphical information corresponding to a visual representation of the authorization status of each event component and the validation status of the event across the predetermined period of time (220). This can be performed, for example, by the GUI circuit 178. For example, the GUI circuit 178 can generate graphical information representing each event component as a rectangle that extends along a common time axis in a bar graph. The dimensions of each rectangle can correspond to the various timing parameters associated with the respective event components as determined by the event parameter determination circuit and the component authorization circuit, such as the start time, the authorization time, an the end time. In one such example, the length of the rectangle representing an event component can span the time period between the start time and the end time.

In addition, the GUI circuit 178 can generate the graphical information such that a visual appearance of each rectangle may be altered for portions of the rectangle according to the authorization status the respective event component, as determined by the component authorization circuit 174. For example, as described above, there may be a time delay between the start time of an event component (e.g., the time at which a physician performs an assessment or medical procedure) and the authorization time for that event component (e.g., the time at which the physician signs a related document). Thus, in this example, the bar representing the event component may change appearance for times after the time at which the signature is obtained to indicate that its authorization status has changed.

The GUI circuit 178 can also be configured to generate graphical information related to the event validation status, which is dependent on the authorization status of each event component as described above. In some arrangements, the GUI circuit 178 can generate graphical information representing the overall event validation status as a rectangle within the bar graph. For example, for all times during which each event component is present and authorized within the bar graph, the GUI circuit 178 can generate a rectangle indicating that the overall event is valid for these times. Times during which the event is not valid can be omitted from the bar representing the event validation status within the bar graph. As a result, the times during which the event is invalid will be easily identifiable by the absence of the event validation status bar, and users viewing the bar graph can quickly identify steps that must be taken to validate the event at each point in time according to the bar graph.

The method 200 also includes causing the graphical information to be displayed on an electronic display device (225). This can be performed, for example, by the GUI circuit 178. In some arrangements, the GUI circuit 178 can transmit the graphical information to an electronic display device, such as the display 116 of the user computing device 110 as shown in FIG. 1. An example implementation of such graphical information is show and described further below in connection with FIG. 3.

Figure 3:
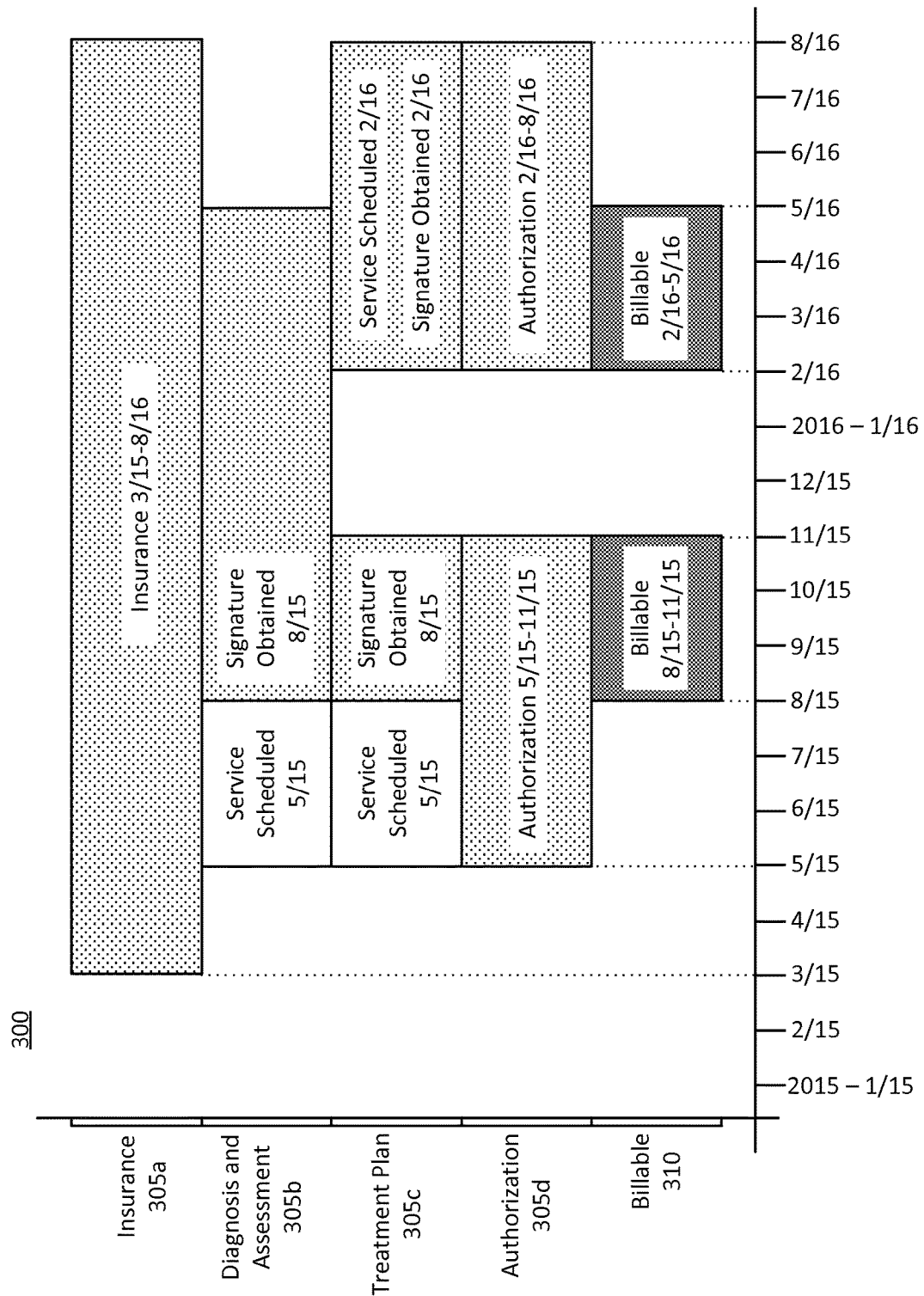
FIG. 3 is a graphical user interface for determining an event validation status, according to an example arrangement.

FIG. 3 is a GUI 300 for determining an event validation status, according to an example arrangement. As described above, the GUI includes a bar graph representing a plurality of event components 305a-305d (generally referred to as event components 305) and an event validation status 310 along a time axis. The event components 305 includes an insurance component 305a, a diagnoses and assessment component 305b, a treatment plan component 305c, and an authorization component 305d. The event validation status 310 shows whether a client is billable at each point along the time axis.

In this GUI 300, a shaded pattern in the bar graph indicates that an event component is authorized. For example, the insurance event component 305a is authorized from 3/15 through 8/16. In some arrangements, the insurance event component 305a is authorized during times in which a customer is covered by a valid insurance policy. Some other event components are not authorized for their entire durations. For example, the diagnosis and treatment plan event component 305b starts when service is scheduled on 5/15. This may correspond to the time at which the customer was first diagnosed and assessed by a physician. However, in this example, the diagnosis and treatment plan event component 305b does not become authorized until a signature (i.e., from one or more physicians) is obtained. Here, the signature is not obtained until 8/15, at which point the bar representing the diagnosis and treatment plan event component 305b becomes shaded.

Similarly the treatment plan component 305c also starts when the treatment plan is developed on 5/15, but does not become valid until a signature is obtained on 8/15. A second treatment plan can be seen as represented by the second rectangle in the treatment plan component 305c, starting on 2/16 and extending through 8/16. The second treatment plan is authorized over its entire duration, because a signature was obtained at the same time as service was scheduled. It should be noted that, in some arrangements, an authorization status may be changed retroactively for certain event components. That is, even if a signature is not obtained until after a start time of an event component, the signature may render the event component authorized over its entire duration when eventually obtained.

The authorization event component 305d can refer to an internal authorization used by the medical facility providing care to the customer. In this example, the authorization event component is shown as valid between 5/15 and 11/15, and between 2/16 and 8/16. No valid authorization status exists between 11/15 and 2/16. The billable status 310 depends upon the values of each of the event components 305 over time. In this example, the billable status 310 is valid only during time periods in which each of the event components 305a are authorized. Thus, the billable status 310 is shown as valid only during the time periods from 8/15 through 11/15, and 2/16 through 5/16. This indicates that the medical facility cannot justly request payment for this particular customer during any other time periods other than those shown as valid in the GUI 300. Thus, the customer (or the customer's insurer) could justly refuse payment for a bill issued, for example, on 7/16. A user viewing the GUI 300 can therefore easily determine when the customer is billable, and can therefore avoid issuing a bill at an inappropriate time (i.e., when the customer is not billable).

In some arrangements, the bars shown in the GUI 300 also can be selectable by a user, for example via an input device such as the input/output circuit 114 shown in FIG. 1. For example, selection of one of the bars shown in the GUI 300 may cause display of related information, such as documentation related to the event component 305 represented by the selected bar. In some arrangements, such documentation may be shown as a scanned image of one or more documents related to the event component 305 represented by the selected bar.

It should be understood that the GUI 300 shown in FIG. 3 is illustrative only. In some arrangements, the GUI 300 may include more, fewer, or different event components 305, as well as a different event validation status 310. In general, the principles illustrated by the GUI 300 may be applied to visually represent any event validation status that depends on one or more event components whose authorization status may change over time.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A system comprising one or more processors and a memory having instructions executable by the one or more processors, the system being configured to:
   receive, by the one or more processors, an indication of a period of time for an event, the event comprising:
      a start time; and
      an authorization time for each of a plurality of event components;
   determine, by the one or more processors, an authorization status of the plurality of event components, the authorization status being based on the start time and the authorization time of each of the plurality of event components, wherein the authorization status of each event component indicates whether the corresponding event is either authorized or not authorized;
   perform, by the one or more processors, a logical operation among the authorization statuses of every event component across the period of time;
   determine, by the one or more processors, a validation status indicating whether the event is valid according to an execution of the logical operation for every event component across the period of time;
   generate, by the one or more processors, a visual representation corresponding to the validation status, the visual representation comprising a graphic having a visual characteristic that varies with the validation status, according to the authorization status of the plurality of event components, wherein the visual representation provides indicia of steps to validate the event when the validation status corresponds to an invalid event; and
   convey, by the one or more processors to an electronic display device, the visual representation.

2. The system of claim 1, wherein the visual representation comprises:
   an event validation status bar, indicating a validity of the event during at least a portion of the period of time.

3. The system of claim 2, wherein:
the graphic comprises a bar graph that comprises a bar corresponding to each event component; and
each bar has a second visual characteristic that varies with the authorization status for said event component.

4. The system of claim 1, wherein the one or more processors are configured to:
receive, from each of a plurality of user computing devices associated with a plurality of corresponding users, an event component comprising the authorization time corresponding to the event component, the plurality of corresponding users corresponding to the plurality of event components.

5. The system of claim 1, wherein the graphic comprises a bar graph, and wherein a bar of the bar graph of the visual representation indicates validity for the event for the period of time, a length of the bar indicative of the period of time.

6. The system of claim 5, wherein the period of time is a predetermined period of time.

7. The system of claim 1, wherein each component of the event corresponds to a schedule associated with a user of a plurality of users.

8. The system of claim 7, wherein the graphic comprises a bar graph, and wherein the bar graph of the visual representation comprises:
selectable interactive elements corresponding to an event component of the plurality of event components,
wherein a selection of a particular interactive element of an event component can cause information associated with said event component to be displayed on the electronic display device.

9. The system of claim 7, wherein the schedule extends a predetermined period of time.

10. The system of claim 1, wherein the start time and the authorization times are received from a plurality of computing devices associated with a corresponding plurality of users.

11. The system of claim 10, wherein the logical operation comprises a logical AND operation.

12. A computer-implemented method comprising:
receiving, by one or more processors from a plurality of computing devices associated with a corresponding plurality of users, an event comprising:
an indication of a predetermined period of time for the event;
a start time; and
an authorization time for each of a plurality of event components;
determining, by the one or more processors, an authorization status of the plurality of event components, the authorization status being based on the start time and the authorization time of each of the plurality of event components, wherein the authorization status of each event component is either authorized or not authorized;
performing, by the one or more processors, a logical AND operation among the authorization statuses of every event component across the predetermined period of time;
determining, by the one or more processors, a validation status indicating whether the event is valid according to the logical AND operation for every event component across the predetermined period of time;
generating, by the one or more processors, a visual representation corresponding to the validation status, the visual representation comprising a graphic having a visual characteristic that varies with the validation status, according to the authorization status the plurality of event components, wherein the visual representation provides indicia of steps to validate the event when the validation status corresponds to an invalid event; and
conveying, by the one or more processors to an electronic display device, the visual representation.

13. The computer-implemented method of claim 12, wherein the visual representation comprises an event validation status bar, indicating a validity of the event during at least a portion of the predetermined period of time.

14. The computer-implemented method of claim 13, wherein the graphic comprises a bar graph that comprises:
a bar corresponding to each event component;
a graphical icon corresponding to the validity of the event component; and
a second visual characteristic of each bar that varies with the authorization status for said event component.

15. The computer-implemented method of claim 12, wherein the one or more processors are configured to:
receive, from each of a plurality of user computing devices associated with the plurality of corresponding users, the event components comprising the authorization time corresponding to the event component, the plurality of corresponding users corresponding to the plurality of event components.

16. The computer-implemented method of claim 12, wherein the graphic comprises a bar graph, and wherein:
each component of the event corresponds to a schedule associated with a user of a plurality of users;
the bar graph of the visual representation comprises selectable interactive elements corresponding to an event component of the plurality of event components; and
a selection of a particular interactive element of an event component is configured to cause information associated with said event component to be displayed on the electronic display device.

17. A non-transitory computer-readable storage medium having instructions encoded thereon which, when executed by one or more processors, cause the one or more processors to perform a method comprising:
receiving, from a plurality of computing devices associated with a corresponding plurality of users, an event comprising:
an indication of a predetermined period of time for the event;
a start time; and
an authorization time for each of a plurality of event components;
determining an authorization status of the plurality of event components, the authorization status being based on the start time and the authorization time of each of the plurality of event components, wherein the authorization status of each event component is either authorized or not authorized;
performing a logical AND operation among the authorization statuses of every event component across the predetermined period of time;
determining a validation status indicating whether the event is valid according to an execution of the logical AND operation for every event component across the predetermined period of time;
generating a visual representation corresponding to the validation status, the visual representation comprising:
a bar graph comprising:
an event validation status bar, indicating a validity of the event during at least a portion of the predetermined period of time, the event validation status bar comprising a first visual characteristic that varies with the validation status; and a plurality of bars, each bar corresponding to each event component and comprising a second visual characteristic that varies with the authorization status for the event component corresponding to the bar; and conveying, to an electronic display device, the visual representation.

18. The storage medium of claim 17, wherein the one or more processors are configured to:

receive, from each of a plurality of user computing devices associated with a plurality of corresponding users, an event component comprising the authorization time corresponding to the event component, the plurality of corresponding users corresponding to the plurality of event components.

19. The storage medium of claim 17, wherein:

each component of the event corresponds to a schedule associated with a user of a plurality of users, wherein the bar graph of the visual representation comprises selectable interactive elements corresponding to an event component of the plurality of event components; and a selection of a particular interactive element of an event component can cause information associated with said event component to be displayed on the electronic display device.

20. The storage medium of claim 17, wherein the visual representation comprises indicia of steps to validate the event when the validation status corresponds to an invalid event.

* * * * *